United States Patent [19]

Boskovic

[11] Patent Number: 5,762,977
[45] Date of Patent: Jun. 9, 1998

[54] MOLD LOCK WITH SELF-PURGING

[76] Inventor: Borislav Boskovic, 2102 Bannockburn, Inverness, Ill. 60067

[21] Appl. No.: 794,143

[22] Filed: Feb. 3, 1997

[51] Int. Cl.[6] .................................................. B29C 45/66
[52] U.S. Cl. ..................... 425/225; 292/147; 425/451.9; 425/595
[58] Field of Search .................. 425/225, 450.1, 425/451.9, 589, 595; 292/147

[56] References Cited

U.S. PATENT DOCUMENTS 4,678,158  7/1987  Brock ........................ 425/451.9
5,662,946  9/1997  Pratt et al. ..................... 425/577

*Primary Examiner*—James P. Mackey
*Attorney, Agent, or Firm*—Lee, Mann, Smith, McWilliams, Sweeney & Ohlson

[57] ABSTRACT

A lock for guiding and aligning two mating portions of a mold. The lock comprises a guide member having a socket formed therein and a locking member which is shaped to be engaged in the socket. A self-purging feature is formed for purging of foreign material from the socket when the locking member and the socket are engaged. Typically, four of the locks are utilized for each mold, one lock being associated with each side of the mold.

10 Claims, 1 Drawing Sheet

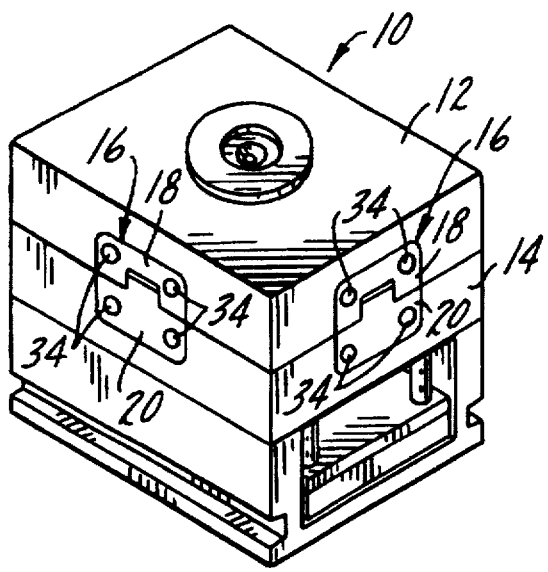
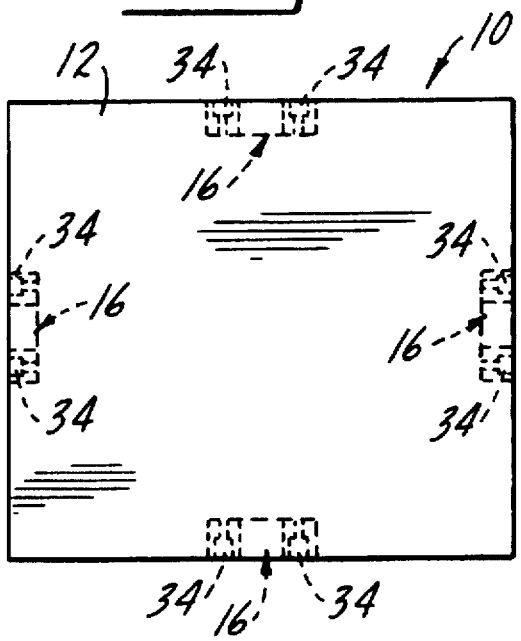
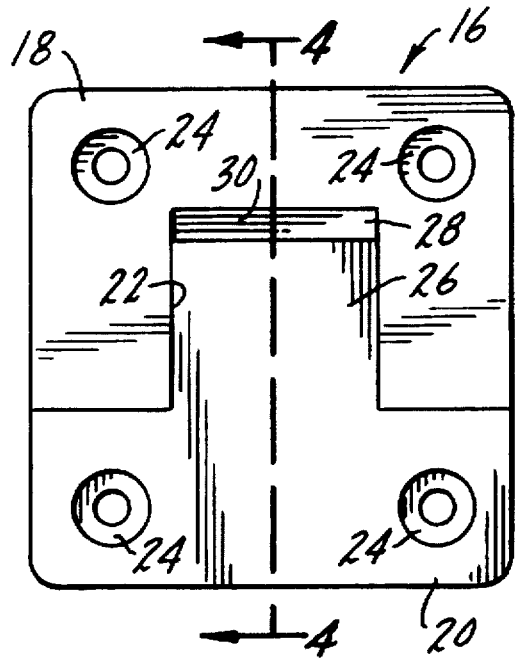
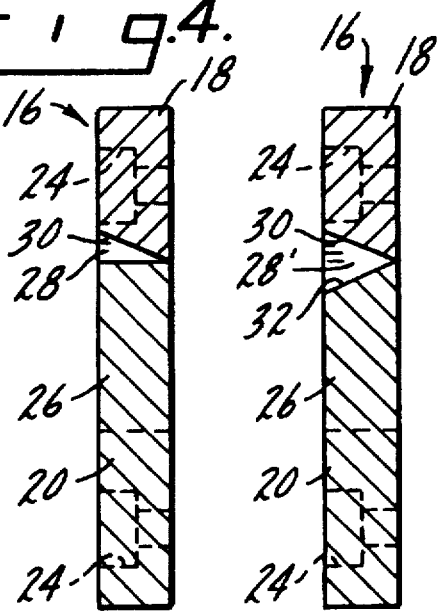

MOLD LOCK WITH SELF-PURGING

BACKGROUND OF THE INVENTION

This invention relates to plastic injection molds, and in particular to a system for guiding and aligning two mating portions of a mold.

A typical injection mold has two mold portions or halves which are opened and closed periodically to permit molding of a plastic part. It is important that the mold portions mate to close tolerances so that imperfections, misaligned parts, inadvertent leakage of injected plastic, and the like are avoided.

Various types of guides and aligning members have been devised to align the portions of a mold. For example, U.S. Pat. No. 4,678,158 discloses locking bars that act as wedges during closing of the mold to attempt to provide proper alignment. National Tool and Manufacturing Company of Kenilworth, N.J., sells items called "side locks", which are elements which mate in a tongue-and-groove fashion on all sides of a mold to properly guide the two portions of the mold as they are engaged. When the tongue, which is attached to one portion of the mold, engages the groove, which is attached to the other part of the mold, the mold portions are properly guided and aligned.

While such locks work properly in most instances, molding is not in a clean environment, and contaminants such as plastic material can invade the locks during the molding process. If the contaminants become lodged in the locks, the mold might not close properly, resulting in molded parts that must be discarded or reground in order for the plastic to be reused. It is therefore important to keep the locking parts clear of contaminants during the molding process in order to avoid premature shutdown of the mold, which can be costly both in terms of lost mold time as well as maintenance of the mold itself.

SUMMARY OF THE INVENTION

The invention is directed to a new lock for guiding and aligning two mating portions of a mold. The lock comprises a guide member, with the guide member having a socket formed therein. Means is provided for attaching the guide member to a first mating portion of the mold. A locking member is provided, with the locking member being shaped to be engaged in the socket. Means is also provided for attaching the locking member to a second mating portion of the mold. The lock also includes means, when the locking member is engaged in the socket, for purging foreign material from the socket.

In accordance with the preferred form of the invention, the purging means comprises a cavity formed between the locking member and the guide member when the locking member is engaged in the socket, with the cavity including means for directing axial force exerted by the guide member and the locking member at an oblique angle. The means for directing force comprises at least one sloped wall of the cavity. In one form of the invention, the sloped wall is formed in the socket. In another form of the invention, a sloped wall is formed in the socket and a complementary sloped wall is formed in the locking member. In yet another form of the invention, the sloped wall is formed only in the locking member.

For attachment, each of the guide member and the locking member has bores through which fasteners may be inserted. Preferably a pair of bores is located in each member.

In the preferred form of the invention, the socket comprises a generally U-shaped pocket in the guide member. The locking member includes a protruding tongue which is shaped to be inserted in the socket to complete the lock when the two members are engaged.

BRIEF DESCRIPTION OF THE DRAWING

The invention is described in greater detail in the following description of examples embodying the best mode of the invention, taken in conjunction with the drawing figures, in which:

FIG. 1 is a perspective, schematic view of a mold, when closed, employing locks according to the invention, FIG. 2 is an enlarged top plan view of the mold shown in FIG. 1, with some detail omitted, showing placement of the locks according to the invention, FIG. 3 is an enlarged elevational view of a lock according to the invention, FIG. 4 is a cross-sectional view taken along lines 4—4 of FIG. 1 , and FIG. 5 is a cross-sectional view similar to FIG. 4, but of a second form of the invention.

DESCRIPTION OF EXAMPLES EMBODYING THE BEST MODE OF THE INVENTION

A mold incorporating locks according to the invention is shown generally at 10 in the drawing figures. The mold 10 comprises two mold portions or halves designated at 12 and 14, respectively. The mold 10 may be conventional, and typically the mold halves 12 and 14 comprise a core and a cavity. Which of the portions 12 and 14 is the core and which is the cavity is unimportant to the present invention and, as just mentioned, the mold 10 may be conventional.

A lock according to the invention is shown generally at 16 in the drawing figures. The lock 16 comprises two elements, a guide member 18 and a locking member 20. As illustrated, the locking member 20 is a male member which engages the female guide member 18.

As best shown in FIGS. 3 through 5, the guide member 18 includes an internal socket 22 which comprises a generally U-shaped pocket in the guide member 18. A pair of bores 24 extend through the guide member 18 for attachment to one of the portions 12 or 14 of the mold 10.

The locking member 20, complementary to the socket 22, includes a protruding tongue 26 which is shaped to be engaged in the socket 22. Similar to the guide member 18, the locking member 20 also includes a pair of bores 24 through which fasteners may be inserted to attach the locking member 20 to one of the mold portions 12 or 14.

As shown in FIGS. 3 and 4, when the guide member 18 and the locking member 20 are engaged, a cavity 28 is formed when the two parts 18 and 20 are fully closed. The cavity 28 includes a sloped wall 30 so that when the members 18 and 20 are closed, any contaminants that remain are pushed into the cavity 28 and are ejected, due to the sloped wall 30, from the cavity 28 as the members 18 and 20 are closed. As will be evident, the axial closing force of the members 18 and 20 exerted on any contaminants in the cavity 28 is directed, by the sloped wall 30, at an oblique angle to the axial closing direction of the two members 18 and 20.

FIG. 5 illustrates a slight modification, where a cavity 28' is also formed, including the sloped wall 30 and a sloped wall 32 which is formed on the protruding tongue 26. Therefore, both the sloped walls 30 and 32 act to force any contaminants from the cavity 28' as the two members 18 and 20 are closed.

It is required that at least one of the walls 30 and 32 be sloped. In a further form of the invention, the wall 30 can be formed perpendicular to the axes of the members 18 and 20 with only the wall 32 being sloped. In essence, this is the formation of FIG. 4, but with the tongue 26 having the sloped wall rather than the socket 22. Thus, while different shapes of the cavities 28 and 28' will be evident, from hereon the cavities will be collectively referred to as the cavity 28.

As is conventional, the locks 16 are located in indentations formed in the mold portions 12 and 14, and a series of fasteners 34 are employed for fixing the members 18 and 20 in place. Preferably, the lock 16 is formed so that either of the members 18 or 20 can be secured to the mold portion 20 and the other of the members 18 or 20 secured to the mold portion 14, although it is best for the members 18 and 20 to be oriented so that only the tongue 26 protrudes beyond one of the mold portions 12 or 14. Also, although not illustrated, the locks 16 can be formed as top locks rather than side locks, with the same interengagement of the guide member 18 and the locking member 20, with the purging cavity 28 being formed when the two members are engaged.

Various changes can be made to the invention without departing from the spirit thereof. For example, although the walls 30 and 32 have been shown with straight slopes, the slopes can be other than straight. Also, the cavity 28 has been illustrated as extending the entire width of the socket 22. The cavity 28 can be formed so that it occupies less than the entire width, so long as the purging function occurs. The invention is as set forth in the appended claims.

What is claimed is:

1. A lock for guiding and aligning two mating portions of a mold, comprising
   a. a guide member, said guide member having a socket formed therein,
   b. means for attaching said guide member to a first mating portion of the mold,
   c. a locking member shaped to be engaged in said socket,
   d. means for attaching said locking member to a second mating portion of the mold, and
   e. means when said locking member is engaged in said socket for purging foreign material from said socket.

2. A lock according to claim 1 in which said purging means comprises a cavity formed between said locking member and said guide member when said locking member is engaged in said socket, said cavity including means for directing axial force exerted by said guide member and said locking member at an oblique angle.

3. A lock according to claim 2 in which said means for directing axial force at an oblique angle comprises at least a sloped wall of said cavity.

4. A lock according to claim 3 in which said sloped wall is formed in said socket.

5. A lock according to claim 3 in which a said sloped wall is formed in said socket and said locking member, said sloped walls being complementary.

6. A lock according to claim 3 in which said sloped wall is formed in said locking member.

7. A lock according to claim 1 in which said means for attaching comprises bores through said members.

8. A lock according to claim 7 including a pair of bores in each member.

9. A lock according to claim 1 in which said socket comprises a generally U-shaped pocket in said guide member.

10. A lock according to claim 1 in which said locking member includes a protruding tongue shaped to be inserted in said socket.

* * * * *